US009449003B1

(12) United States Patent
D'amour et al.

(10) Patent No.: US 9,449,003 B1
(45) Date of Patent: Sep. 20, 2016

(54) SYSTEM, METHOD, AND COMPUTER PROGRAM FOR PRESENTING ENTITY-RELATED EVENTS USING RADIALLY SEGMENTED CONCENTRIC CIRCLES

(75) Inventors: John D'amour, Sunnyvale, CA (US); Abhay V. Acharekar, Cupertino, CA (US)

(73) Assignee: Amdocs Software Systems Limited, Dublin (IE)

( * ) Notice: Subject to any disclaimer, the term of this patent is extended or adjusted under 35 U.S.C. 154(b) by 922 days.

(21) Appl. No.: 13/232,872

(22) Filed: Sep. 14, 2011

(51) Int. Cl.
*G06F 17/30* (2006.01)

(52) U.S. Cl.
CPC ... *G06F 17/30061* (2013.01); *G06F 17/30867* (2013.01); *G06F 17/30064* (2013.01); *G06F 17/30241* (2013.01)

(58) Field of Classification Search
CPC ............ G06Q 50/01; G06Q 30/0201; H04M 1/72569; H04L 67/22; G06F 17/30044; G06F 17/30064; G06F 17/3087; G06F 17/30061; G06F 17/30029; G06F 17/30241; G06F 17/30867; G06F 17/30873
USPC ........................................................ 707/740
See application file for complete search history.

(56) References Cited

U.S. PATENT DOCUMENTS

| 6,448,987 B1* | 9/2002 | Easty ..................... G06F 3/0482 715/834 |
| 6,927,772 B2* | 8/2005 | Page ..................... G06T 11/206 345/419 |
| 6,970,931 B1* | 11/2005 | Bellamy et al. .............. 709/227 |
| 8,237,714 B1* | 8/2012 | Burke ............... G06T 17/30572 345/440 |
| 2003/0107575 A1 | 6/2003 | Cardno |
| 2006/0069603 A1* | 3/2006 | Williams et al. ................. 705/9 |
| 2007/0239535 A1* | 10/2007 | Koran et al. .................... 705/14 |
| 2008/0103800 A1* | 5/2008 | Domenikos ............ G06Q 40/02 705/318 |
| 2008/0154654 A1 | 6/2008 | Niessen et al. |
| 2009/0164439 A1* | 6/2009 | Nevins .................. G06Q 40/02 |
| 2010/0157742 A1* | 6/2010 | Relyea ................ G04G 9/0082 368/28 |
| 2010/0162170 A1* | 6/2010 | Johns ....................... G04G 9/06 715/834 |
| 2010/0185984 A1* | 7/2010 | Wright .................. G06T 11/206 715/833 |
| 2013/0054652 A1* | 2/2013 | Antonelli et al. ............ 707/797 |

* cited by examiner

*Primary Examiner* — Tony Mahmoudi
*Assistant Examiner* — Merilyn Nguyen
(74) *Attorney, Agent, or Firm* — Zilka-Kotab, PC

(57) ABSTRACT

A system, method, and computer program product are provided for presenting entity-related events using radially divided concentric circles. In use, a plurality of events associated with at least one entity is stored. Additionally, a set of the events is retrieved according to a preconfigured time period. Further, each of the events in the set is categorized according to a plurality of predefined categories. Still yet, a plurality of concentric circles each segmented by a radial axis centered on the concentric circles is displayed, where each segment is associated with a different one of the predefined categories and each concentric circle is associated with a different portion of the preconfigured time period. Moreover, each of the events in the set is presented in one of the segments of one of the concentric circles, based on the categorization.

14 Claims, 6 Drawing Sheets

SYSTEM, METHOD, AND COMPUTER PROGRAM FOR PRESENTING ENTITY-RELATED EVENTS USING RADIALLY SEGMENTED CONCENTRIC CIRCLES

FIELD OF THE INVENTION

The present invention relates to data presentation, and more particularly to the presentation of entity-related events.

BACKGROUND

In the past, entity-related events have been presented in a "data grid" format, such as in a table, for viewing by a user. Each row in the grid generally represents an event, and columns in the grid show event id, event type, event date, event category, etc. Unfortunately, such format is associated with various limitations. For example, is difficult for the user to decipher the information just by looking at a data grid with rows and columns, particularly when the user needs to quickly identify a particular event.

There is thus a need for addressing these and/or other issues associated with the prior art.

SUMMARY

A system, method, and computer program product are provided for presenting entity-related events using radially divided concentric circles. In use, a plurality of events associated with at least one entity is stored. Additionally, a set of the events is retrieved according to a preconfigured time period. Further, each of the events in the set is categorized according to a plurality of predefined categories. Still yet, a plurality of concentric circles each segmented by a radial axis centered on the concentric circles is displayed, where each segment is associated with a different one of the predefined categories and each concentric circle is associated with a different portion of the preconfigured time period. Moreover, each of the events in the set is presented in one of the segments of one of the concentric circles, based on the categorization.

DETAILED DESCRIPTION

Figure 1:
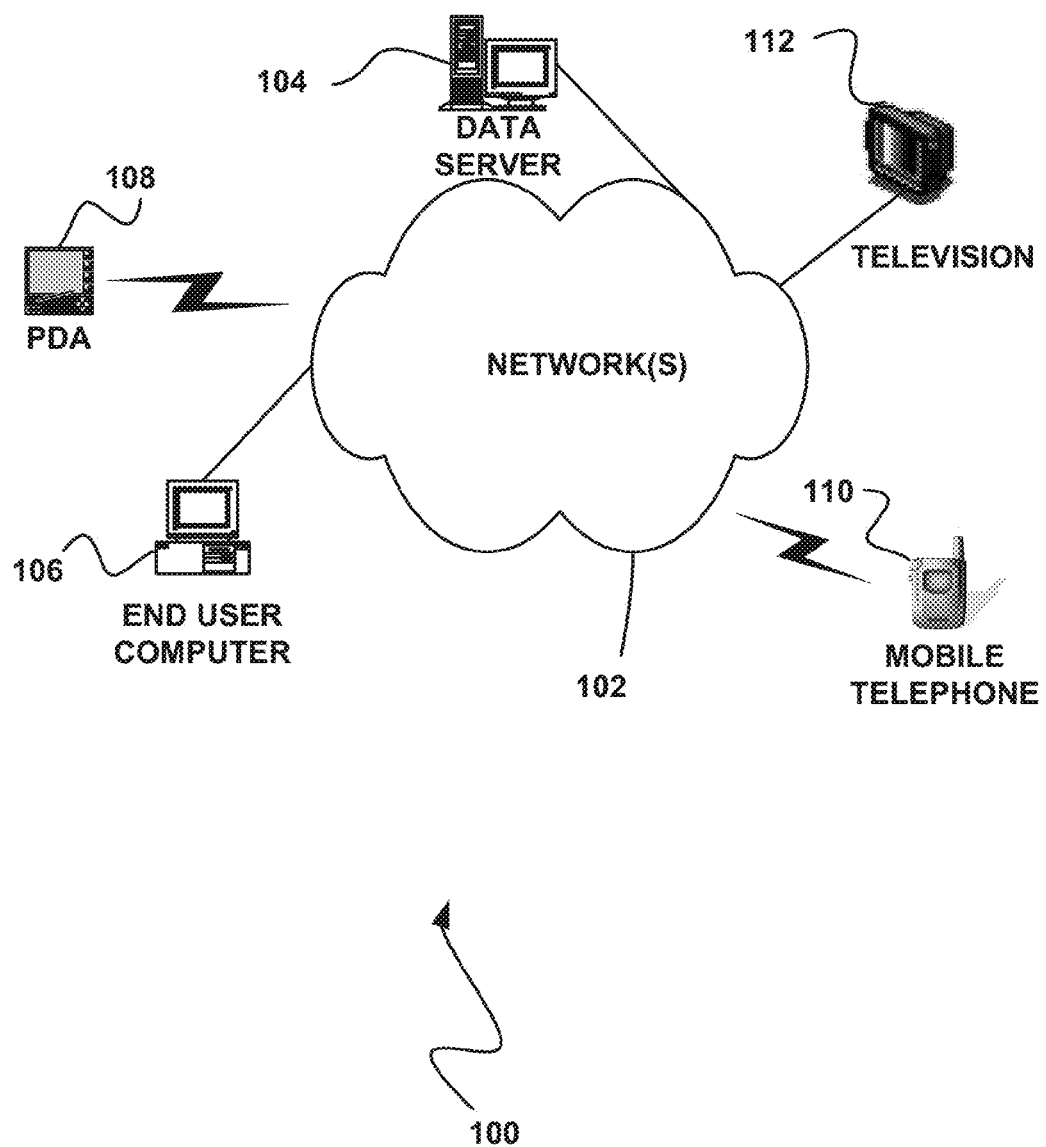
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
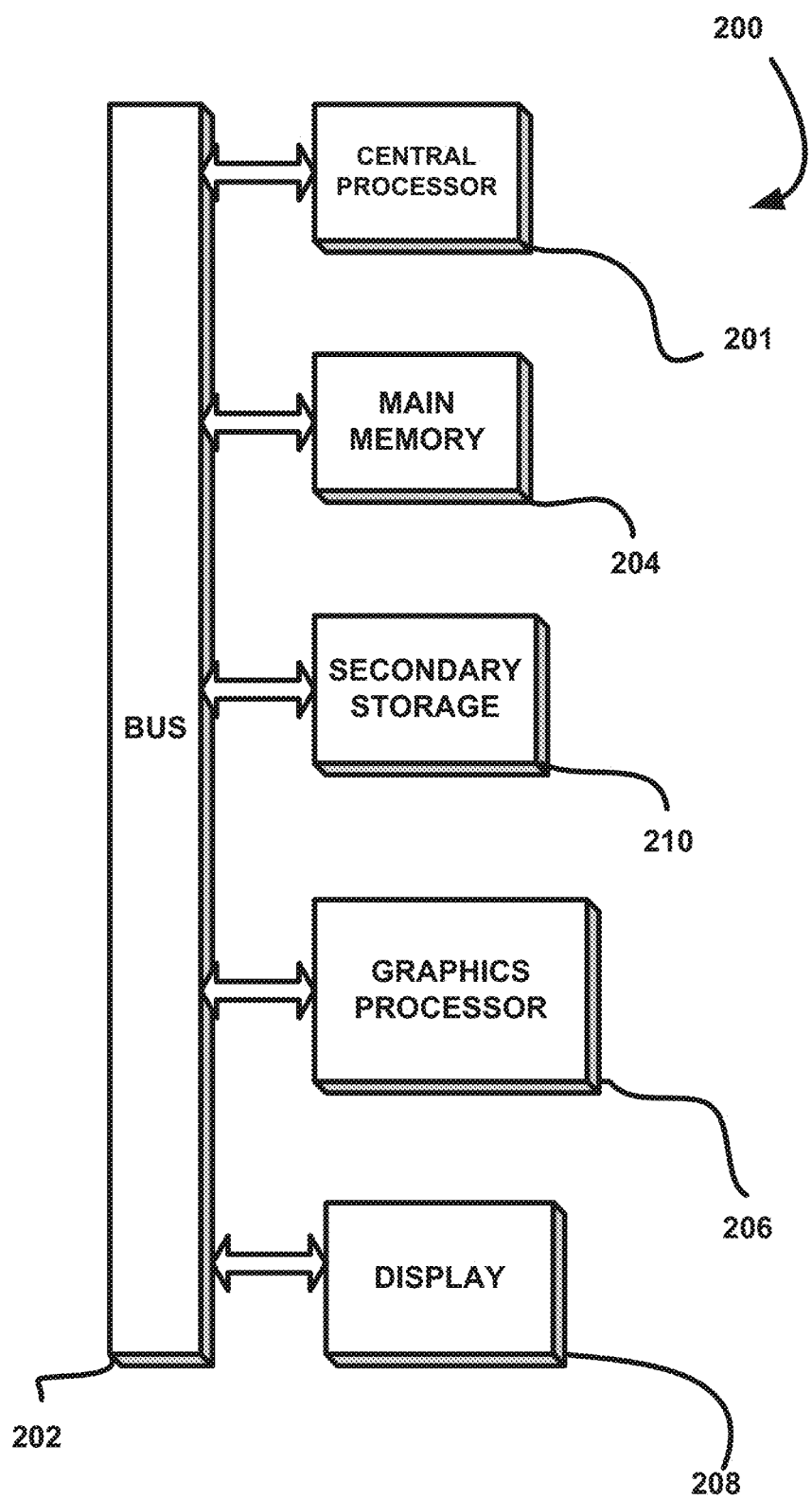
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
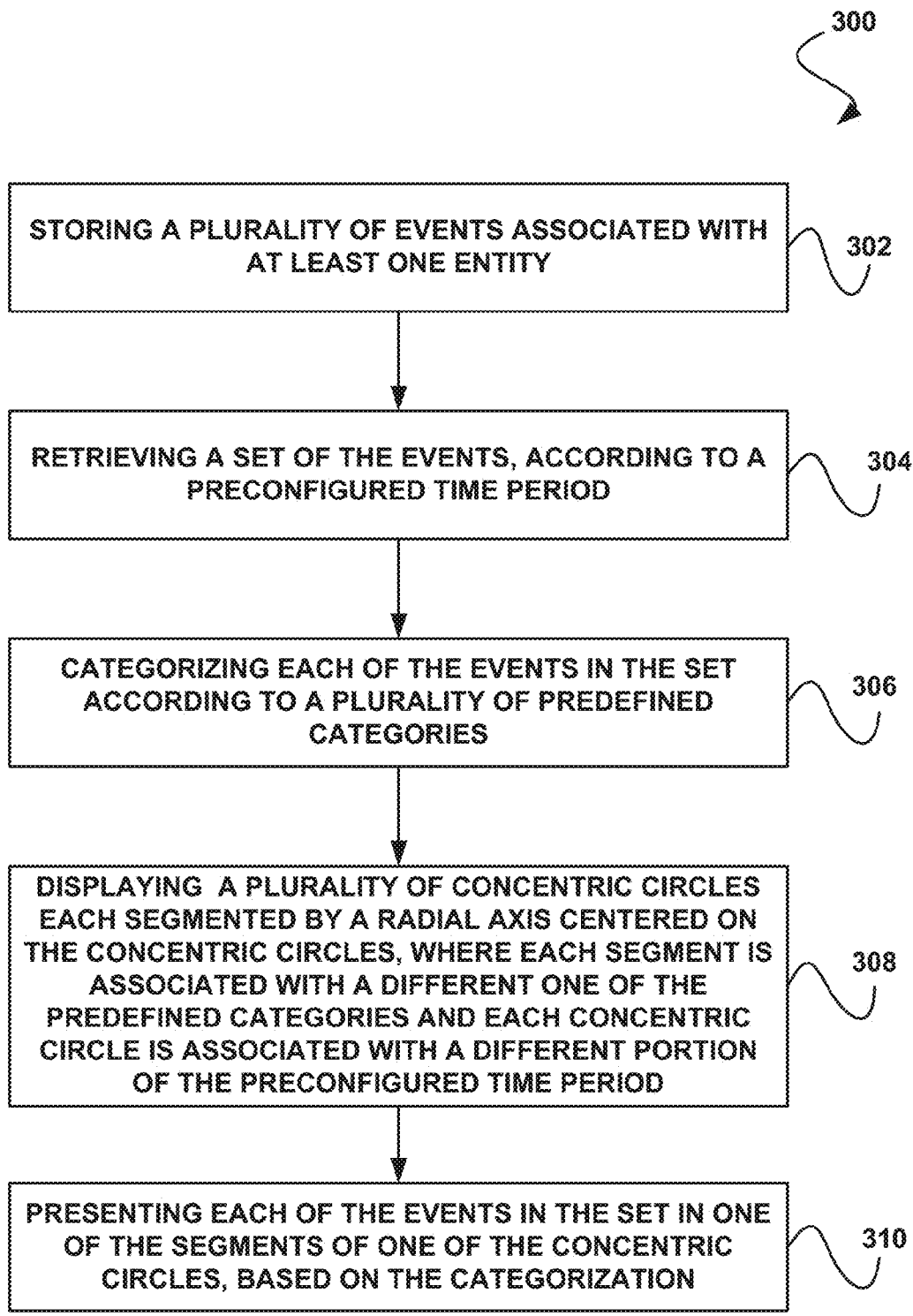
FIG. 3 illustrates a method for presenting entity-related events using radially segmented concentric circles, in accordance with one embodiment.

FIG. 3 illustrates a method 300 for presenting entity-related events using radially segmented concentric circles, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a plurality of events associated with at least one entity is stored. In the context of the present description, the entity may include any person, organization, company, etc. capable of being associated with a plurality of events. For example, the entity may include a customer of a service provider subscribed to by the customer.

It should also be noted that the events associated with the entity may include any occurrence of an activity or other performance of an action in association with the entity. Thus, the events may be collected (e.g. by the service provider) and stored over time. In one embodiment, the event may be initiated, performed, etc. by the entity. In another embodiment, the event may be initiated, performed, etc. for making a provision to the entity, such as for providing information, a service, etc. to the entity.

Just by way of example, where the entity is the customer of the service provider, the events may be actions performed with respect to the customer and the service provider. In various exemplary embodiments, the events may include submitting a bill to the customer by the service provider, changing a service rate plan for the customer by the service provider, changing account information for the customer by the service provider, and receiving a call from the customer by the service provider relating to one of a product and a service provided by the service provider, etc.

The events may be stored in any desired manner. In one embodiment, the events may each be stored as a row in at least one table of a database. In another embodiment, the events may each be stored with a timestamp identifying a time of the event (e.g. where the timestamp is stored in a field of the row). In another embodiment, the events may each be stored with a unique identifier of the entity with which it is associated. In still yet another embodiment, the events may each be stored with information describing the event (e.g. where each piece of information is stored in a separate field of the row). For example, the information may include a category of the event (described in more detail below), a sub-category (e.g. type) of the event, etc.

Additionally, as shown in operation 304, a set of the events is retrieved according to a preconfigured time period. The preconfigured time period may include any period of time over which at least some of the events are capable of having had occurred. As an option, the preconfigured time period may include a default time period, such as a time period starting from a current day/time and ending a default amount of time prior to the current day/time (e.g. a last week, a last four weeks, etc.).

As another option the preconfigured time period may include a time period configured by a user. For example, the time period configured by the user may change the time period from the default time period to a different time period set by the user. Such user may include a user requesting to view the set of events, in one embodiment.

To this end, retrieving the set of the events according to the preconfigured time period may include retrieving events from the stored events that occurred within the preconfigured time period. For example, the set of events may be determined using the timestamp stored in association with each event. As noted above, the set of events may be retrieved in response to a user request to view the set of the events.

Further, as shown in operation 306, each of the events in the set are categorized according to a plurality of predefined categories. In one embodiment, each of the events may be categorized under one of the predefined categories. As an option, the categorization may be performed by using the category of the event stored in association with the event, as described above (e.g. by matching the stored category of the event to one of the predefined categories).

It should be noted that the predefined categories may include any categories that are predefined for use in categorizing events. For example, the predefined categories may include billing, account, rate plan, equipment, service, etc. The predefined categories may optionally be associated with the aforementioned service provider to which the events are related (e.g. for which the events are collected).

As an option, the predefined categories may include default categories. As another option, the predefined categories may include categories defined by a user. For example, the categories defined by the user may change the default categories to different categories set by the user. Such user may include a user requesting to view the set of events, in one embodiment.

Still yet, a plurality of concentric circles each segmented by a radial axis centered on the concentric circles is displayed, where each segment is associated with a different one of the predefined categories and each concentric circle is associated with a different portion of the preconfigured time period. Note operation 308. For example, a graphical user interface (GUI) may display the radially segmented concentric circles (e.g. to the aforementioned user). In one embodiment, the radial axis used to segment the concentric circles may include an x-axis and a y-axis, where the fixed point (i.e. intersecting point of the x-axis/y-axis) is centered on in innermost circle of the concentric circles.

As noted above, each segment of the radial axis centered on the concentric circles may be associated with a different one of the predefined categories. Thus, a segment of the radial axis may be provided for each of the predefined categories. For example, if there are four predefined categories, there may be four quadrants (i.e. segments) resulting from the radial axis centered on the concentric circles.

As also noted above, each concentric circle is associated with a different portion of the preconfigured time period. In one embodiment, the preconfigured time period may be divided (e.g. equally, etc.) among the concentric circles. As an option, there may be a predefined number of concentric circles, such that the preconfigured time period may be divided (e.g. equally, etc.) among the concentric circles. Just by way of example, where the preconfigured time period includes a four week period of time and there are four concentric circles, each of the concentric circles may be associated with a different week within that four week period of time.

The portions of the preconfigured time period may be distributed across the concentric circles in any desired manner. In one embodiment, the portions of the preconfigured time period may be ordered across the concentric circles. For example, an innermost one of the concentric circles may be associated with the most recent portion of the preconfigured time period, a second most one of the concentric circles may be associated with the second most recent portion of the preconfigured time period, and so on.

Moreover, as shown in operation 310, each of the events in the set is presented in one of the segments of one of the concentric circles, based on the categorization. In this way, each of the events may be displayed in one of the segments of one of the concentric circles, for viewing purposes (e.g. by the aforementioned user).

In one embodiment, operation 310 may be performed for each event in the set of event by identifying a time that the event occurred. One of the concentric circles associated with a portion of the time period including the identified time may then be selected. In addition, a categorization of the event may be identified. A segment of the selected one of the concentric circles may then be selected based on a match of the categorization of the event with the one of the predefined categories that is associated with the segment. The event may then be presented in the selected segment of the selected one of the concentric circles.

In one exemplary embodiment, the aforementioned user may be a call center agent for a service provider of which the at least one entity is a customer. In response to a call from the customer to the call center agent, the call center agent may request to view events associated with the customer. In response to the request, the method 300 may be executed to present events within the radially segmented concentric circles, thereby allowing the call center agent to view a concise depiction of an event history of the customer according to an event category and time of occurrence for each event.

As an option, each event may be presented as an icon in one of the segments of one of the concentric circles. Such icon may be representative of a sub-category of the event. For example, a plurality of predefined icons may be provided for each of a plurality of sub-categories of each of the aforementioned predefined categories, such one of such predefined icons associated with a sub-category of the event may be used for presenting the event in one of the segments of one of the concentric circles. One of the predefined icons may be determined for an event by matching a sub-category of the event (e.g. stored in association with the event, as described above) with one of the sub-categories represented by a predefined icon.

As a further option, each presented event (e.g. icon) may be selectable for presenting details of the event. For example, in response to a user selecting one of the presented events, previously unshown information about the selected event may be displayed. Of course, in another embodiment, the presented event may be hovered over for showing the previously unshown information.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
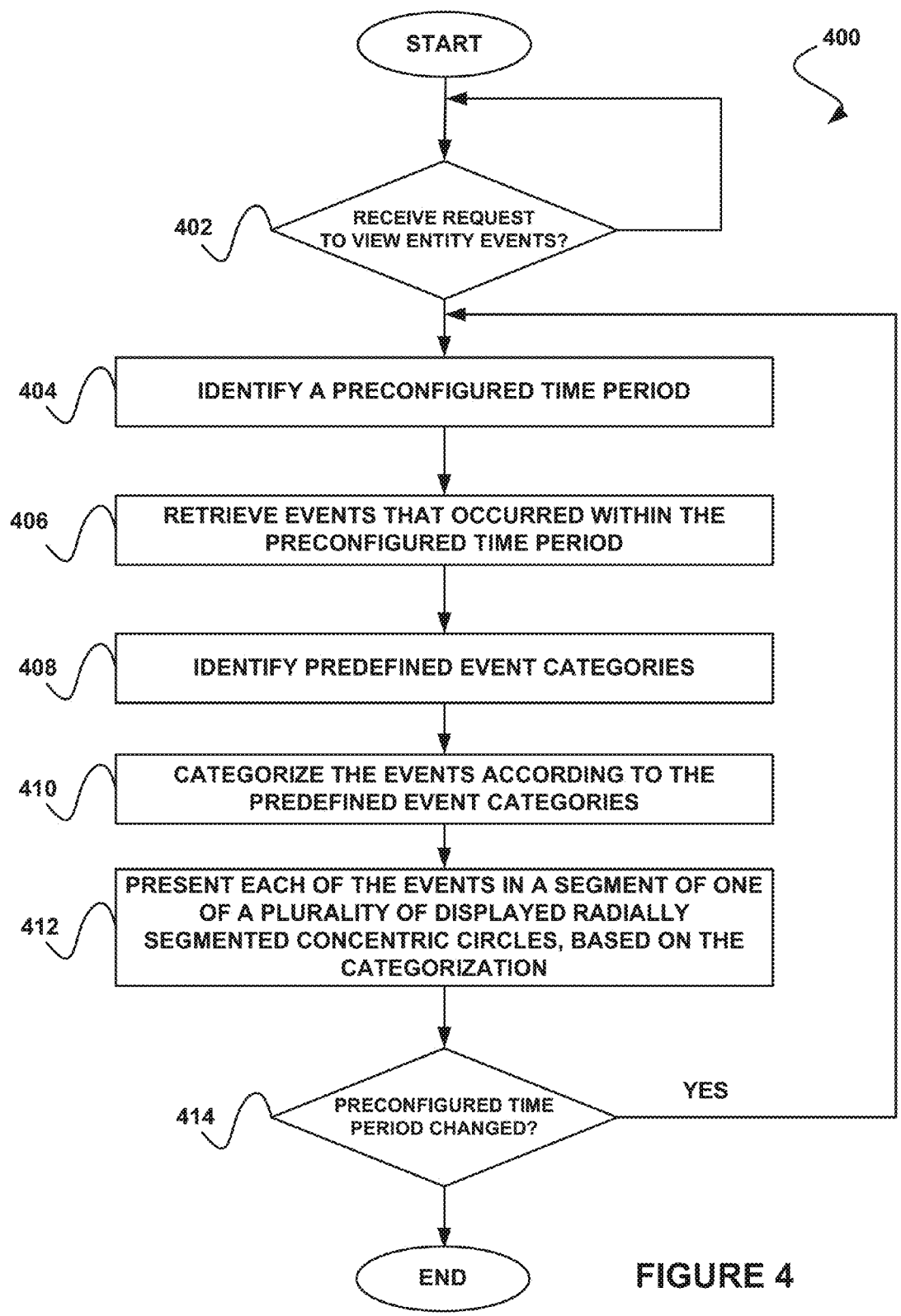
FIG. 4 illustrates a method for presenting entity-related events using radially segmented concentric circles according to configurable parameters, in accordance with another embodiment.

FIG. 4 illustrates a method 400 for presenting entity-related events using radially segmented concentric circles according to configurable parameters, in accordance with another embodiment. As an option, the method 400 may be carried out in the context of the details of FIGS. 1-3. Of course, however, the method 400 may be carried out in any desired environment. Further, the aforementioned definitions may equally apply to the description below.

As shown in decision 402, it is determined whether a request to view events associated with an entity is received. In one embodiment, the request may be received from a user desiring to view at least a portion of the events associated with the entity. For example, the user may be holding a call with the entity to answer a question of the entity. As an option, the request may be received via a GUI presenting information associated with the entity (e.g. a profile of the entity, an account of the entity with a service provider, etc.).

If it is determined that a request to view events associated with an entity is not received, the method 300 waits for receipt for such a request. If, however, it is determined that a request to view events associated with an entity is received, a preconfigured time period is identified. Note operation 404. The preconfigured time period may include a default time period or a time period previously configured (e.g. by the user).

Additionally, events associated with the entity that occurred within the preconfigured time period are retrieved, as shown in operation 406. For example, the events may be retrieved from a database storing all events associated with the entity. In one embodiment, a timestamp stored for each event may be compared to the preconfigured time period to identify and retrieve the events that occurred within such preconfigured time period.

Further, as shown in operation 408, predefined event categories are identified. The predefined event categories may include a plurality of predefined categories under which the events may be categorized. Thus, the predefined event categories may be of a broad enough nature that each event is capable of being categorized under one of the categories. In one embodiment, the predefined event categories may relate to various activities, services, products associated with the service provider, such that events associated with the entity which are also related to the service provider may be categorized according to such predefined event categories.

Just by way of example, the predefined event categories may include accounts held by the service provider, products supported by the service provider, bills (i.e. invoices) generated by the service provider, rate plans provide by the service provider, etc. The predefined event categories may include a default categories or categories previously configured (e.g. by the user).

As shown in operation 410, the events are then categorized according to the predefined event categories. For example, a category of each event may be matched to one of the predefined event categories, for categorizing the event under such predefined event category. As another example, information describing the event may be used to categorize the event under one of the predefined event categories (e.g. based on a determination that the information is related to the predefined event category).

Still yet, each of the events is presented in a segment of one of a plurality of displayed radially segmented concentric circles, based on the categorization. Note operation 412. For example, one of the concentric circles associated with a time period in which the event occurred may be identified, and a segment of such identified concentric circle that is associated with the categorization of the event may also be identified. The event may then be presented in the identified segment of the identified concentric circle.

Moreover, it is determined whether the preconfigured time period has changed, as shown in decision 414. For example, the user may change the preconfigured time period after the presentation of the events in the radially segmented concentric circles, for modifying which events are presented in the radially segmented concentric circles. The preconfigured time period may be expanded to include additional time, for example, if the user desires to view additional events in the radially segmented concentric circles. The preconfigured time period may be reduced to exclude some of the time, for example, if the user desires to view fewer events in the radially segmented concentric circles.

If it is determined that the preconfigured time period has not changed, the method 400 terminates, or alternately may continue to wait for the preconfigured time period to be changed. If it is determined that the preconfigured time period has changed, the method 400 continues with operations 404-412 in which the updated preconfigured time period is identified and events within such updated preconfigured time period are retrieved, for presentation thereof in the radially segmented concentric circles, as described above.

Figure 5:
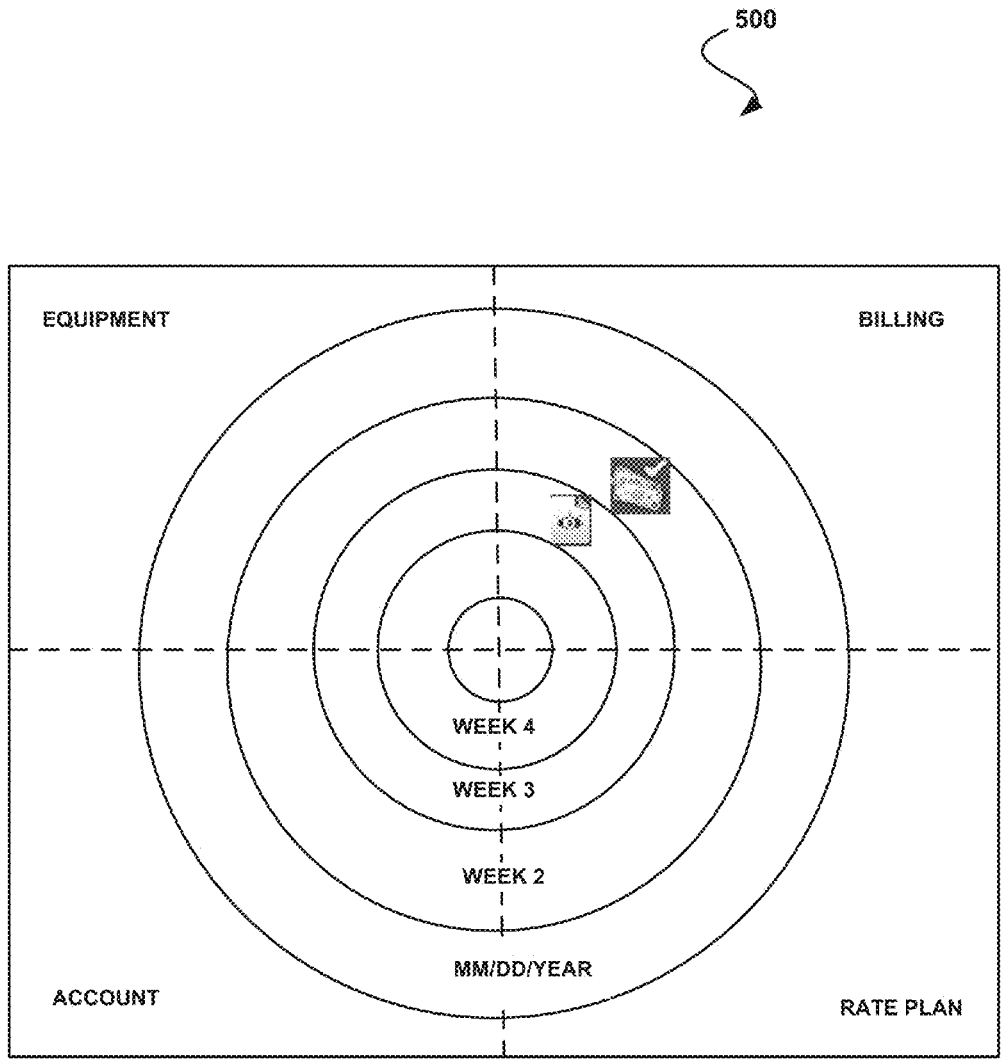
FIG. 5 illustrates a graphical user interface presenting entity-related events using radially segmented concentric circles, in accordance with yet another embodiment.

FIG. 5 illustrates a GUI 500 presenting entity-related events using radially segmented concentric circles, in accordance with yet another embodiment. As an option, the GUI 500 may be implemented in the context of the details of FIGS. 1-4. Of course, however, the GUI 500 may be implemented in any desired environment. Again, the aforementioned definitions may equally apply to the description below.

The concentric circle presentation provided by the GUI 500 gives a user viewing the GUI 500 a comprehensive view of all of the events for a particular customer that occurred within a particular period of time. Customer related events are represented by an icon in the circle. The events are represented in polar coordinates with the radial component representing the temporal information of the event and the angular component representing the category of the event.

Figure 6:
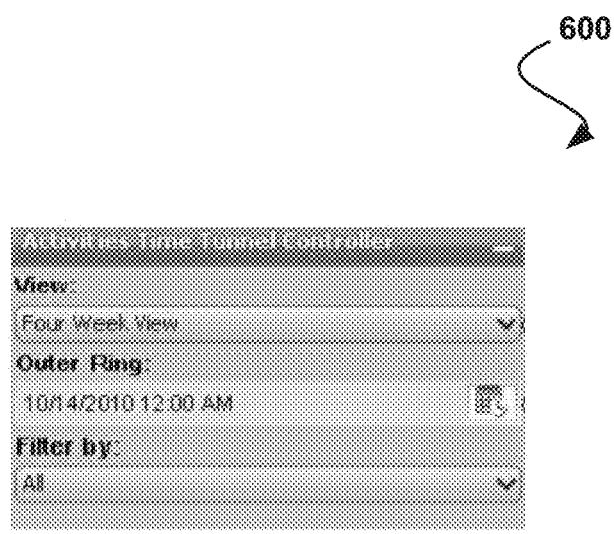
FIG. 6 illustrates a graphical user interface for configuring a presentation of entity-related events using radially segmented concentric circles, in accordance with still yet another embodiment.

Each circle is divided into segments that represent a categorization of the events (shown as Billing, Rate Plan, Equipment, and Account). The radial axis represents time. The time period represented by the concentric circle presentation may be configured from a default time period (e.g. to 1 week, 4 weeks, or 12 weeks, etc.) for example, using the GUI 600 of FIG. 6. The outermost circle shows the most recent events and the innermost circle shows the farthest events in the time period.

As noted above, the customer related events are represented on the concentric circles as icons. The icons represent a particular type (e.g. sub-category) of an event. For example, a "Bill Sent" event may have an icon so that the user can identify the event type solely by its icon. The segment in which the icon is presented allows the user to identify the category of the event visually. For example, a "Bill Sent" event may be placed in the Billing segment and an event including a change in the rate plan for a customer may be presented in the Rate Plan segment.

The user may hover the mouse over an event icon to see its details, and even be presented with a detail screen for the event. The user may also filter on the events by type, for example, using the GUI 600 of FIG. 6. For example, for a particular category (i.e. segment), events of only a particular type may be displayed according to a type selected by the user via the GUI 600 of FIG. 6.

As an option, the color of the inner most circle may be either green or red. A color of green may signify that there are more events outside of the represented period of time (which are thus not represented in the concentric circle presentation). A color of red may signify that there are no events outside of the represented period of time. For example, if a 4-week period of time is chosen and if there are events outside of the selected four week period, the innermost circle may be green, otherwise it may be red. The concentric circle presentation shown in FIG. 5 may therefore be utilized to show a history of events in a concise manner which is easily understandable by the user. Additionally, by presenting the events by time and category, the user may be able to quickly identify a particular event associated with the customer.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising computer code for:
   storing, by a system, a plurality of past events that have occurred in association with a plurality of customers of an entity;
   receiving, by the system, a call from one of the customers to a call center agent of the entity;
   after receiving the call, receiving, by the system, a request from the call center agent for the past events associated with the one of the customers;
   retrieving a set of the past events associated with the one of the customers that occurred within a preconfigured time period;
   categorizing each of the past events in the set according to a plurality of predefined categories relating to an account of the one of the customers with the entity;
   displaying, by the system to the call center agent, a plurality of concentric circles each segmented by a radial axis centered on the concentric circles, wherein each segment is associated with a different one of the predefined categories and each concentric circle is associated with a different portion of the preconfigured time period; and
   presenting, by the system, each of the past events in the set in one of the segments of one of the concentric circles, based on the categorization, including:
      identifying a time that the past event occurred,
      selecting the one of the concentric circles associated with a portion of the time period including the identified time,
      identifying a categorization of the past event,
      selecting a segment of the selected one of the concentric circles based on a match of the categorization of the past event with one of the predefined categories associated with the segment,
      determining an icon for the past event by identifying one of a plurality of sub-categories within the matching predefined category that matches a sub-category stored in association with the past event, where each of the plurality of sub-categories is represented by a distinct icon, and
      presenting the determined icon for the past event in the selected segment of the selected one of the concentric circles;
   receiving, by the system from the call center agent, a command to filter the presented past events in one of the segments by one of the sub-categories;
   in response to the command, showing in the one of the segments only the past events presented therein that are of the one of the sub-categories.

2. The computer program of claim 1, wherein the past events are actions performed with respect to the customers and service provider that is the entity.

3. The computer program of claim 2, wherein the past events include at least one of submitting a bill to the customers by the service provider, changing a service rate plan for the customers by the service provider, changing account information for the customers by the service provider, and receiving a call from the customers by the service provider relating to one of a product and a service provided by the service provider.

4. The computer program of claim 1, wherein the computer program product is operable such that the past events are each stored with a timestamp identifying a time of the pas event.

5. The computer program of claim 1, wherein the computer program product is operable such that the pas events are each stored with information describing the past event.

6. The computer program of claim 5, wherein the information describing the past event includes a category of the past event and a sub-category of the past event.

7. The computer program of claim 1, wherein the computer program product is operable such that retrieving the set of the past events according to the preconfigured time period includes retrieving past events from the stored past events that occurred within the preconfigured time period.

8. The computer program of claim 1, wherein the predefined categories include at least one of billing, account, rate plan, equipment, and service.

9. The computer program of claim 1, wherein the computer program product is operable such that the preconfigured time period is divided equally among the concentric circles.

10. The computer program of claim 1, wherein the computer program product is operable such that each presented past event is selectable for presenting details of the past event.

11. The computer program of claim 1, presenting, by the system, each of the past events in the set in one of the segments of one of the concentric circles, based on the categorization further includes:
 determining whether there are additional past events stored by the system that occurred outside of the preconfigured time period,
 presenting an innermost circle of the concentric circles in a first color when it is determined that there are additional past events stored by the system that occurred outside of the preconfigured time period, and
 presenting the innermost circle of the concentric circles in a first color when it is determined that there are not additional past events stored by the system that occurred outside of the preconfigured time period,
 wherein the first color is utilized as an indicator that there are additional past events stored by the system that occurred outside of the preconfigured time period and the second color is utilized as an indicator that there are not additional past events stored by the system that occurred outside of the preconfigured time period.

12. A method, comprising:
 storing by a system, a plurality of past events that have occurred in association with a plurality of customers of an entity;
 receiving, by the system, a call from one of the customers to a call center agent of the entity;
 after receiving the call, receiving, by the system, a request from the call center agent for the past events associated with the one of the customers;
 retrieving a set of the past events associated with the one of the customers that occurred within a preconfigured time period;
 categorizing each of the past events in the set according to a plurality of predefined categories relating to an account of the one of the customers with the entity;
 displaying, by the system to the call center agent, a plurality of concentric circles each segmented by a radial axis centered on the concentric circles, wherein each segment is associated with a different one of the predefined categories and each concentric circle is associated with a different portion of the preconfigured time period; and
 presenting, by the system, each of the past events in the set in one of the segments of one of the concentric circles, based on the categorization, including:
 identifying a time that the past event occurred,
 selecting the one of the concentric circles associated with a portion of the time period including the identified time,
 identifying a categorization of the past event,
 selecting a segment of the selected one of the concentric circles based on a match of the categorization of the past event with one of the predefined categories associated with the segment,
 determining an icon for the past event by identifying one of a plurality of sub-categories within the matching predefined category that matches a sub-category stored in association with the past event, where each of the plurality of sub-categories is represented by a distinct icon, and
 presenting the determined icon for the past event in the selected segment of the selected one of the concentric circles;
 receiving, by the system from the call center agent, a command to filter the presented past events in one of the segments by one of the sub-categories;
 in response to the command, showing in the one of the segments only the past events presented therein that are of the one of the sub-categories.

13. A system, comprising:
 a processor for:
 storing, by the system, a plurality of past events that have occurred in association with a plurality of customers of an entity;
 receiving, by the system, a call from one of the customers to a call center agent of the entity;
 after receiving the call, receiving, by the system, a request from the call center agent for the past events associated with the one of the customers;
 retrieving a set of the past events associated with the one of the customers that occurred within a preconfigured time period;
 categorizing each of the past events in the set according to a plurality of predefined categories relating to an account of the one of the customers with the entity;
 displaying, by the system to the call center agent, a plurality of concentric circles each segmented by a radial axis centered on the concentric circles, wherein each segment is associated with a different one of the predefined categories and each concentric circle is associated with a different portion of the preconfigured time period; and
 presenting, by the system, each of the past events in the set in one of the segments of one of the concentric circles, based on the categorization, including:
 identifying a time that the past event occurred,
 selecting the one of the concentric circles associated with a portion of the time period including the identified time,
 identifying a categorization of the past event,
 selecting a segment of the selected one of the concentric circles based on a match of the categorization of the past event with one of the predefined categories associated with the segment,
 determining an icon for the past event by identifying one of a plurality of sub-categories within the matching predefined category that matches a sub-category stored in association with the past event, where each of the plurality of sub-categories is represented by a distinct icon, and
 presenting the determined icon for the past event in the selected segment of the selected one of the concentric circles;
 receiving, by the system from the call center agent, a command to filter the presented past events in one of the segments by one of the sub-categories;
 in response to the command, showing in the one of the segments only the past events presented therein that are of the one of the sub-categories.

14. The system of claim 13, wherein the processor is coupled to memory via a bus.

* * * * *